United States Patent [19]

Cherry et al.

[11] Patent Number: 4,977,873
[45] Date of Patent: Dec. 18, 1990

[54] TIMING CHAMBER IGNITION METHOD AND APPARATUS

[75] Inventors: Mark A. Cherry, El Cajon, Calif.; Clifford L. Elmore, 1568 Honey Hill Ter., El Cajon, Calif. 92020

[73] Assignee: Clifford L. Elmore, El Cajon, Calif.

[21] Appl. No.: 363,523

[22] Filed: Jun. 8, 1989

[51] Int. Cl.⁵ .................................... F02M 19/00
[52] U.S. Cl. ............................ 123/267; 123/266
[58] Field of Search ........... 123/267, 256, 266, 260, 123/286, DIG. 1

[56] References Cited

U.S. PATENT DOCUMENTS

| | | | |
|---|---|---|---|
| 1,700,603 | 11/1927 | Vreeland et al. | 123/267 |
| 2,456,080 | 12/1948 | Wu Pe | 123/266 |
| 2,520,378 | 8/1950 | Veit | 123/32 |
| 3,710,764 | 1/1973 | Jozlin | 123/266 |
| 3,741,175 | 6/1973 | Rouger | 123/48 |
| 3,954,093 | 5/1976 | Hughes | 123/266 |
| 4,071,001 | 1/1978 | Goto | 123/267 |
| 4,218,993 | 8/1980 | Blackburn | 123/267 |
| 4,241,703 | 12/1980 | Lin-Liaw | 123/48 |
| 4,319,552 | 3/1982 | Sauer et al. | 123/267 |
| 4,338,897 | 7/1982 | Drumheller et al. | 103/267 |
| 4,465,031 | 8/1984 | Bamer et al. | 123/260 |
| 4,499,399 | 2/1985 | Flores | 123/266 |
| 4,736,718 | 4/1988 | Linder | 123/267 |

Primary Examiner—Raymond A. Nelli
Attorney, Agent, or Firm—William H. Maxwell

[57] ABSTRACT

A method and apparatus for timed ignition of a fuel-air mixture in internal combustion engines, incorporated therein or as a replacement unit therefor, providing an ignition chamber open into the combustion chamber, there being a catalytic igniter positioned in the ignition chamber to contact a pressure front of said fuel-air mixture penetrating the ignition chamber during the compression cycle and ignited thereby to effect the power cycle.

28 Claims, 2 Drawing Sheets

TIMING CHAMBER IGNITION METHOD AND APPARATUS

BACKGROUND OF THE INVENTION

Internal combustion engines employ the Otto spark ignition cycle and the Carnot compression ignition cycle, in the engines of the type under consideration. These distinct engine cycles are carried out in various forms of engines which are recognized conventionally as either two cycle or four cycle, including reciprocating as well as rotary engines. This invention is particularly concerned with the prior art spark ignition Otto cycle engine which employs compression to heat a combustible admixture of gas and air, with ignition thereof by a timed spark heretofore produced by a high tension electrical system and with commutation to the multiplicity of spark plugs involved; and employing step-up coils, condensers and breaker points, all combined in a complex system using both low and extremely high voltage electricity. Thus, the prior art has resorted to complex and expensive means so as to cause timed ignition and burning of gases and/or atomized fuels, in this type of widely accepted heat engines. Therefore, it is a general object of this invention to entirely eliminate the complications of high tension spark ignition in Otto cycle engines, and to replace the same with a greatly simplified and much more practical Timing Chamber Ignition.

The ignition system herein disclosed is universally applicable to internal combustion Otto cycle engines of all types. That is, this ignition system is operable in carbureted or atomized fuel injected Otto cycle engines, regardless of the type of fuel employed, providing a stoichiometric ratio of fuel to air exists to support combustion. Therefore, it is a primary object of this invention to provide a method and apparatus for timed ignition of internal combustion engines by providing pressure responsive means to ignite the fuel-air mixture with inherently correct results, and eliminating the conventional high tension spark. ignition with its advance and retard system of breaker points. The method of ignition herein disclosed can be practiced in any reciprocating or rotary type engine presently used, simply by replacing the spark plugs and by removing the present high tension commutated spark generating system. The method herein disclosed involves response to the compression of the fuel-air mixture in the engine combustion chamber, which normally occurs before top dead center of the engine crank motion, by transferring a pressure front from said compression mixture and into a closed chamber that is in open communication with the combustion chamber, and by positioning an igniter means in the closed chamber for contact with the said compression mixture for its ignition.

With this invention, there is progressive movement of the pressure front into the closed chamber, preferably an elongated ignition chamber that is penetrated by the pressure front to the position of the igniter means. At this pressure front level and/or position within the closed chamber, ignition occurs and continues in the usual manner. The results herein disclosed differ from prior art glow plug technology in that the normal use of a glow plug does not provide any timing whatsoever. The advancement of the ignition time in this invention is automatically controlled by the density of the charge During idle the throttle is nearly closed and a very high vacuum exists in the intake system of the engine, and thus the density in the combustion chamber is correspondingly low, so that the fuel-air mixture reaches the igniter means later in time. However, during open throttle conditions the charge is at greater density and the fuel-air mixture reaches the igniter means sooner in time. It is to be understood that the time at which the igniter means is reached by the pressure front relates to the dynamic position of the crank shaft, or equivalent, with respect to its top dead center position and transition into the power cycle or stroke of the engine.

It is another object of this invention to advantageously employ a gas spring effect which is inherent with gasses captured in an air space. Heretofore, glow plugs and the like have simply been exposed to gasses within the combustion chamber of the engine, devoid of timing control of any kind. However, with the present invention the elasticity of the gasses in an ignition chamber functions as a spring which controls the penetration of the pressure front of compressed mixture from the combustion chamber and into the ignition chamber. In practice, the ignition chamber is of a configuration whereby igniter means is positioned therein with respect to the response of the air spring to said pressure front and so that movement of the pressure front into contact with the igniter means occurs when ignition is required. As will be described, the ignition chamber is comprised of a timing zone open to the combustion chamber, and a buffer zone fixed or adjusted as to displacement in order to provide the required gas spring effect. When ignition occurs, all combustible gases within the timing zone as well as within the buffer zone are burned, and continuing into the combustible mixture compressed within the combustion chamber.

It is still another object of this invention to advantageously employ a gas shied effect which is inherent with the presence of previously burnt gases in the ignition chamber as they are controlled by the aforesaid gas spring effect. With the present invention, reduced combustion chamber pressure during the engine intake cycle or stroke causes extension of the said gas spring and thereby occludes the igniter means with non combustible gasses. The occlusion precludes ignition of the cumbustible gas-air intake mixture. However, when compression occurs in the combustion chamber, the pressure front therefrom enters through the passageway and into the timing zone of the ignition chamber where it continues to move toward the igniter means as compression increases. Accordingly, the pressure front establishes a boundary layer between burnt gasses in the captured air space of the buffer zone and the combustible gasses progressively penetrating the timing zone to subsequently contact the igniter means positioned therein at the point of ignition. The point of ignition is thereby precisely operative according to the air spring's predetermined response to the pressure conditions within the combustion chamber of the engine.

SUMMARY OF THE INVENTION

This invention relates to timed ignition of fuel-air mixtures in internal combustion engines, without the use of commutated high tension spark ignition systems. A characteristic feature of this inventive concept is the employment of a separate timing chamber and igniter means exposed therein, and all of which is in open communication with the combustion chamber of the engine. That is, a passageway enters the engine combustion chamber where a spark plug would normally be positioned for best performance. The passageway openly communicates into a closed timing chamber into which a compressed fuel-air mixture pressure front penetrates during the compression cycle of the engine, there being igniter means at a level or pressure front position corresponding to the corresponding point at which the ignition is required for optimum engine performance. It Is to be understood that the timing chamber displacement is adjusted and/or controlled for particular engine performance, so that optimum ignition timing is established therefor. A feature is the response of the igniter means in the timing zone of the ignition chamber, to the fuel-air density as a result of throttle conditions. There is an unobvious gas spring effect and gas shield effect controlled thereby, to preclude pre-ignition while inherently timing ignition in response to pressure conditions within the combustion chamber. Accordingly, this Timing Chamber Ignition Method and Apparatus automatically adjusts to engine operating conditions. In practice, the igniter means is a heated element such as a glow plug or the like positioned in the entry zone at a position where ignition of the pressure front is to occur, the igniter means being electrically energized with a suitable low vehicle voltage. As shown, this Timing Chamber Ignition is incorporated in a component or unit that replaces a spark plug. However, permanent features thereof can or will be incorporated in the engine structure as may be desired, with parts subject to deterioration made replaceable as circumstances require.

The foregoing and various other objects and features of this invention will be apparent and fully understood from the following detailed description of the typical preferred forms and applications thereof, throughout which description reference is made to the accompanying drawings.

THE DRAWINGS

Figure 5:
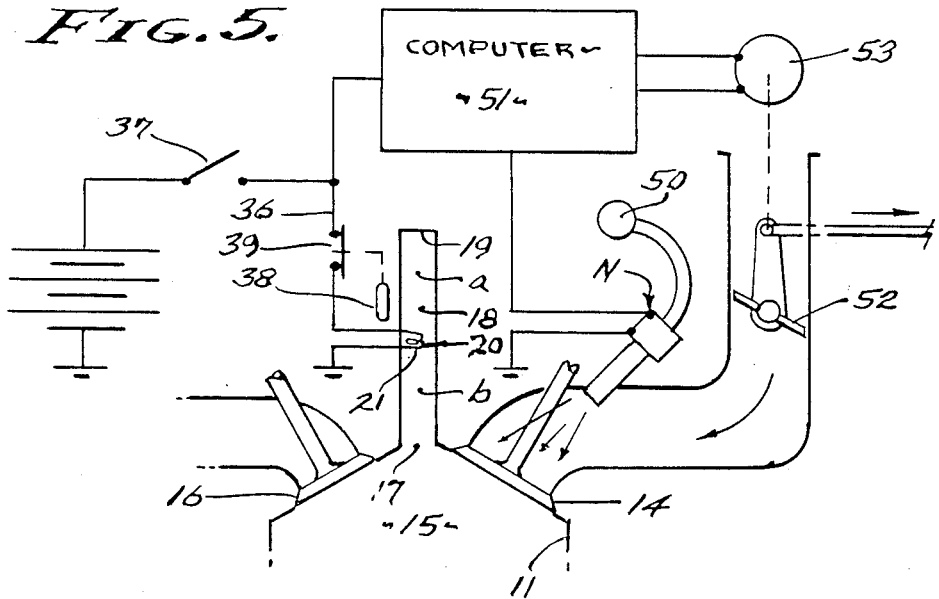

And, FIG. 5 is a schematic diagram illustrating the Timing Chamber ignition as it is combined with a fuel injected Otto cycle engine.

PREFERRED EMBODIMENT

This invention provides a method of Otto cycle engine ignition and timing therefor, without the use of conventional high tension spark ignition and its complexities. This method comprises a first step of providing a closed ignition chamber with a timing zone having an entry passage from the combustion chamber of the engine and with a buffer zone in open communication with the timing zone and extending away from the entry passage; a second step of exposing an igniter means at a position where the timing zone and buffer zone are in open communication; a third step of transferring a pressure front comprised of a combustible fuel-air mixture from the combustion chamber of the engine and through the entry passage so as to penetrate through the timing zone during the compression cycle of the engine; a fourth step of capturing a determined volume of gasses in the buffer zone as an elastic medium to react in equilibrium with the pressure of gasses in the cumbustion chamber, as a spring; and the fifth step of depressing the captured buffer zone gasses with the penetrating pressure front of the combustible fuel-air mixture for contact thereof with the igniter means; whereby ignition of the combustible fuel-air mixture is initiated in the ignition chamber and progresses into the combustion chamber to effect the power cycle of the engine.

This method is performed during the operation of Otto cycle engines, the most common of such engines being the gasoline engine having a piston moving with a crank shaft to compress an inducted fuel-air mixture into a closed combustion chamber. Retraction of the piston during the intake cycle causes a partial vacuum that is reversed to positive pressure progressively increasing during the compression cycle, whereby a pressure level is increased to a peak compression.

The first step of providing the closed ignition chamber exposes the fuel-air mixture within the combustion chamber to a separate closed chamber, whereby a pressure front of combustible fuel-air mixture progressively penetrates through the entry passage and into the timing zone of the ignition chamber. In practice, the volume of the ignition chamber is variable and/or fixed.

The second step of exposing the igniter means involves the placement of an igniter means at a determined depth of penetration into the ignition chamber timing zone. The required placement can be empirical and carried out by observation and experience, and is performed by positioning a heater element, preferably of heated catalytic material, at a depth in the timing zone of the ignition chamber, to attain the engine performance desired.

The third step of transferring a pressure front of combustible fuel-air mixture into the ignition chamber is performed by providing open communication from the combustion chamber of the engine and into the timing zone of the ignition chamber.

The fourth step of capturing a determined volume of gasses in the buffer zone of the ignition chamber involves a dead air space in which burnt gasses are alternately compressed and depressed in equilibrium with gas pressure changes in the combustion chamber of the engine. Essentially therefore, the burnt gasses captured in the buffer zone react as a spring of non combustible gasses that occlude the igniter means when subjected to reduced pressures and thereby extended, and that alternately expose the igniter means to the pressure front of combustible fuel-air mixture when subjected to peak compression pressures of said combustible fuel-air mixture. Accordingly, the captured buffer gasses react as an elastic spring to control ignition timing in response to gas pressures as they prevail in the combustion chamber of the engine.

The fifth step of depressing the buffer zone gasses is performed in response to the compression cycle of the engine and progesses until the pressure front of the combustible fuel-air mixture reaches the igniter means heated to ignition temperature, and placed and exposed according to the second step, at which time ignition occurs in the ignition chamber at the peak pressure condition of compressed fuel-air mixture in the combustion chamber and which is ignited thereby to continue to burn in the normal manner.

Figure 1:
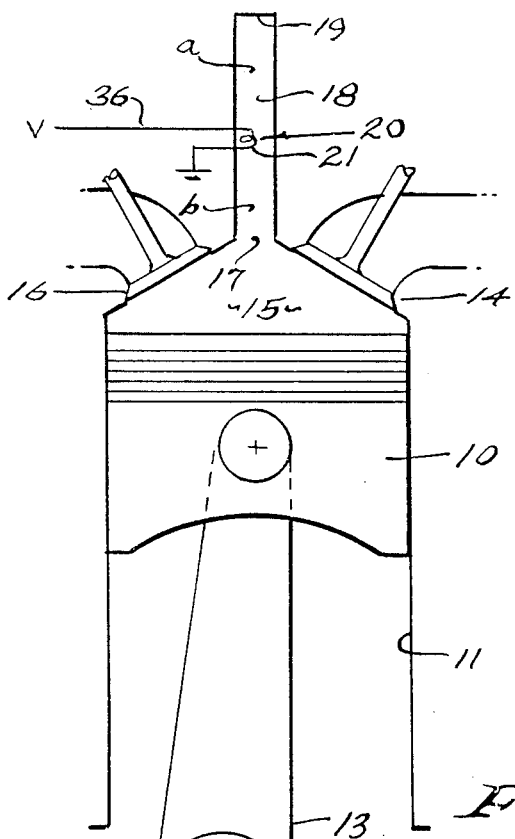
FIG. 1 is a diagramatic view of a typical internal combustion engine cross section, showing the pressure responsive ignition apparatus incorporated therein, with the crank shaft and piston shown in the compression cycle before top dead center position of the crank shaft and approximately at the normal position and condition at which ignition is to take place.

Referring now to the drawings, FIG. 1 illustrates a typical reciprocating engine having a piston 10 operating in a cylinder 11 and coupled to a crank shaft 12 by a connecting rod 13. There is an intake valve 14 into a combustion chamber 15 at the top end of the cylinder, and there is an exhaust valve 16 therefrom. A cross flow hemispherical combustion chamber is shown, with ignition at a top center position. It is to be understood that the engine example shown is for illustration purposes only, and that any such engine design, including rotary engines, can incorporate the features disclosed herein. The characteristic requirement for such an engine is means for intake of a fuel-air mixture, means for effecting a compression cycle followed by a power cycle, and means for exhaust, and that there be a fuel-air mixture compression cycle followed by a power cycle.

As shown in FIG. 1, an entry passage 17 opens into the combustion chamber 15 to receive the pressure front of the fuel air mixture during the compression cycle. The size of this entry passage is relatively small, an opening of 0.125 inch diameter to 0.375 inch diameter, which have performed well in moderate sized automotive engines. In practice, the entry passage 17 is positioned where a spark plug might otherwise occur. And, an ignition chamber 18 continues from and is in open communication with the entry passage 17, a closed chamber blind at its deepest end or top 19. In practice, the ignition chamber 18 is an elongated tube of the same size or diameter as the entry passage 17. A feature of this invention is the igniter means 20 exposed within the ignition chamber 18, and which is maintained at an ignition temperature of the fuel-air mixture to be ignited thereby, and is located intermediate the entry passage 17 and the top 19 of the ignition chamber. As shown, the igniter means 20 is a glow plug that enters the ignition chamber 18 through a side wall thereof, with its heater element 21 exposed into the ignition chamber. Electrical voltage is applied through a conductor, the body of the glow pug being grounded. A feature is that the heater element is a catalyst made of platinum or the like, so as to enhance the ignition of the pressure front of the fuel-air mixture that moves into contact therewith when peak compression is reached in the combustion chamber 15.

Figure 2:
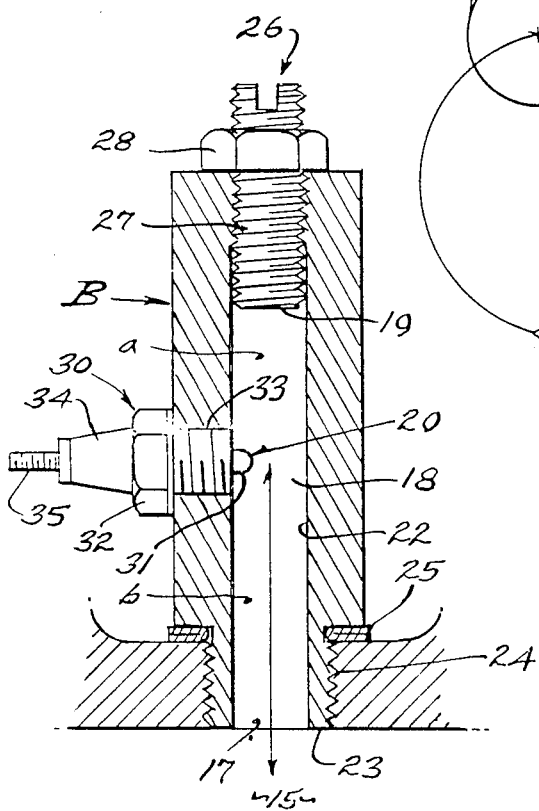
FIG. 2 is an enlarged longitudinal cross sectional view showing the apparatus of the present invention in a component or unit form, with a plug for fine tuning of the engine performance, and utlilizing a glow plug as an igniter means.

The FIG. 2 embodiment discloses a component or unit to replace the usual spark plug and is comprised of a tubular body B having the general cross section and height of the spark plug it is to replace. In its presently preferred form and application the body B is hexagonal in outside configuration, with a concentric bore 22 therethrough to form the ignition chamber 18 and the open entry passage 17 at its lower end 23. The lower end reach portion 24 is threaded for reception into the cylinder head of a usual engine, there being a compression seal 25 to prevent leakage.

A feature of the FIG. 2 embodiment is the variable volume closure means 26 at the top end of a buffer zone a. As shown, means 26 is comprised of a screw plug 27 that enters the ignition chamber 18 to adjust its length, and with a lock nut 28 to fix its height position. Accordingly, there is a captured air space in the top portion of the ignition chamber 18, to be lengthened or shortened as circumstances require, and which is adjusted and/or fixed in its effective displacement volume.

In accordance with this invention, the igniter means 20 is exposed within the ignition chamber 18 intermediate the opening of entry passage 17 into the combustion chamber 15 and its top 19, or bottom face of the screw plug 27, for example about midway therebetween. Accordingly, there is an open timing zone b extending between the entry passage 17 and the placement of the igniter means 20. The glow plug 30 is screw threaded into a side face of the body B and enters into the ignition chamber 18 where its heater element 31 projects into the ignition chamber 18 to intercept and thereby contact the pressure front of the compressed fuel-air mixture forced to enter therethrough. The glow plug 30 is replaceable and has a hexagonal body 32 with a reach 33 threaded through the side wall of the body B, and an insulator 34 for low voltage electrical conductor 35, and a wire lead 36 thereto. The wire lead 36 is controlled by an ignition switch 37 that is closed for engine operation.

A feature of the igniter means 20 is its ability to retain ignition temperature during engine operation without the need for continuous electrical energization. Accordingly, a temperature sensor 38 and control means or switch 39, suitably located, switches the voltage OFF from lead 36 when electrification is not required. In practice, the control means 39 can be remote, or it can be incorporated in the component or unit as is indicated.

Figure 3:
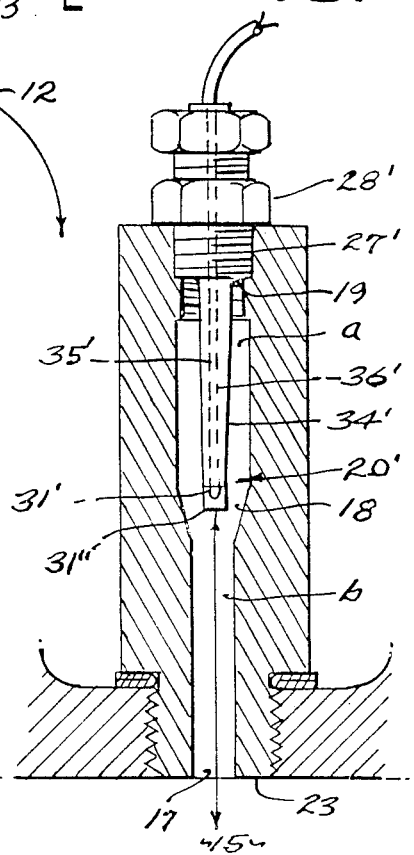
FIG. 3 is a second embodiment, similar to FIG. 1, showing the igniter means adjustable to different pressure front positions for fine tuning of engine performance.

The FIG. 3 embodiment differs from that of FIG. 2 in that the igniter means 20' is adjustable as to height along with the screw plug 27'. As shown, the screw plug 27' is tubular and carries an insulator 34' in which the conductors 35' and 36' pass to the exterior for electrification. Accordingly, a resistance heater element 31' is in circuit with conductors 35' and 36' and is embraced by a heater element 31" carried by an extension of the insulator 34'. Thus, the element 31", preferably a catalyst, is placed below the screw plug 27' and is fixed in position by a lock nut 28'.

Figure 4:
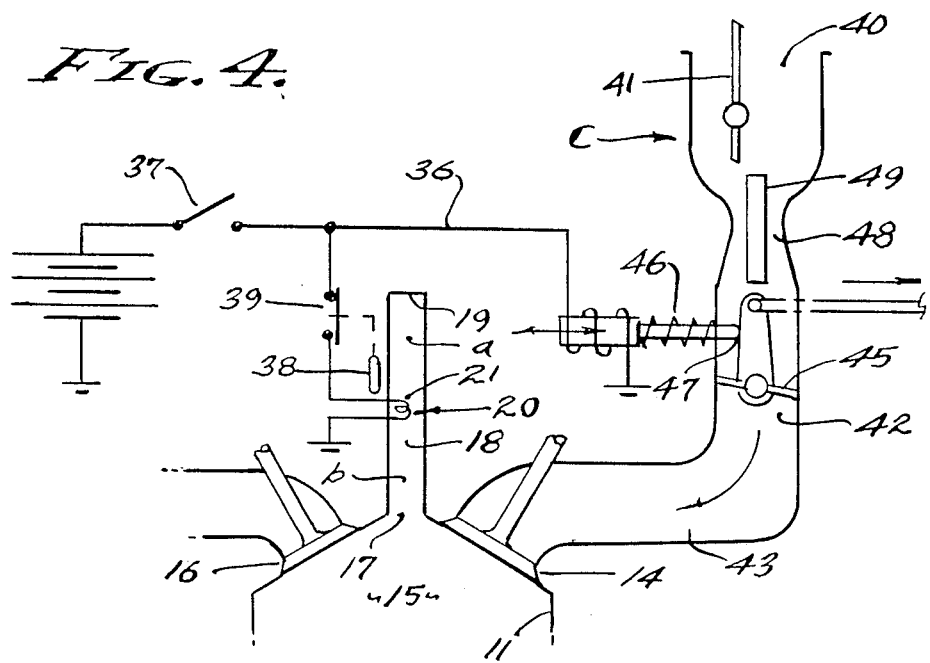
FIG. 4 is a schematic diagram illustrating the Timing Chamber Ignition as it is combined with a carbureted Otto cycle engine.

Operation of an engine is generally as follows: The igniter means is brought to operating temperature by applying electrical voltage thereto, after which the engine is started by a starter means in the usual manner. The voltage applied and current through the heater element is maintained until the heat of combustion is sufficient to sustain that temperature. Manuevering, city driving and highway driving of automotive vehicles employing this system remains unchanged in every respect. This ignition is inherently self timing, as it is responsive to combustion chamber conditions that reflect engine performance. The engine is stopped by allowing the throttle plate to fully close as shown in FIG. 4, which is accomplished by idle control means that withdraws the idle setting means of the carburetor when the ignition switch is OFF. Alternately, in fuel injected engines as shown in FIG. 5, the injection system is simply deactivated. Therefore, without fuel-air mixture induction, or without fuel injection, the engine inherently ceases to operate.

Referring now to the carbureted application of this Timing Chamber Ignition as shown in FIG. 4 of the drawings, there is a carburetor C having an air intake 40 with a choke plate 41, and having a fuel air mixture outlet 42 into the engine intake manifold 43. Intermediate the intake 40 and outlet 42 there is a throttle plate 45, shown closed by a spring 46 and shiftable stop means 47. In practice, the stop means 47 is an electrical solenoid or the like energized when the ignition switch 37 is ON or closed so as to move the throttle plate 45 into an idle setting (not shown). The venturi 48 and running mixture tube 49 preceed the throttle plate and provide the fuel-air mixture that enters the combustion chamber 15 through the intake valve 14 when it is opened. Accordingly, engine operation is conventional except for control over the idle setting of the throttle plate 45 by stop means 47, which may be mechanical or electrical as shown.

Referring now to the fuel injection application of this Timing Chamber Ignition as shown in FIG. 5 of the drawings, there is a fuel injector nozzle N directed through the intake valve 14, receiving liquid fuel from a pressure controlled manifold 50 supplied by a fuel pump not shown). A computer means 51 responds to the required conditions of engine functions including position of the throttle plate 52, as by means of a potentiometer 53 or the like. Significantly, this electronic fuel inJection operates according to the various state of the art embodiments thereof, without any major changes; the same being true of mechanical fuel injection applications. However, it is to be understood that vacuum advance and retard signals from a distributor is no longer an existant function, and is therefore a factor that is eliminated from the computer programming. Accordingly, operation is conventional in every respect except for the lack of spark advance and retard which are functions no longer existant in the control system of the present invention.

From the foregoing it will be understood that the igniter means 20 is removed from the engine combustion chamber 15, while the ignition chamber 18 remains in open communication with said combustion chamber 15 to receive the compression front of combustible gasses through the entry passage 17. When the compression front reaches the igniter means 20 ignition occurs, the charge of combustible gasses in the combustion chamber 15 being at the same ignition-burn pressure and temperature for continued burning during the power cycle. Many advantages are realized over prior art high tension spark ignition systems. There are no moving parts to wear or to get out of-order. There are no complex electrical or electronic controls. There is a reduction of emissions. There are no proJections into the combustion chamber that would retain heat and cause pre-ignition or run-on. And there is less chance of a miss-fire due to lack of spark, since the igniter means retains heat and is not subject to malfunction because of dampness. Also, there are no high voltage leads or any such related equipment to maintain,:low voltage power being sufficient. And with this system, high ignition temperatures are achieved without radio interference, which eliminates the need for voltage dropping suppressor wiring and resistors.

After a successful reduction to practice in a single cylinder engine, this Timing Chamber Ignition (T.C.I.) was successfully operated in a six cylinder vehicle, followed by operation in a state of the art vehicle with a 3.8 liter multiport fuel injection V6 engine. This latter installation was in a stock vehicle previously subJected to a State of California smog inspection wherein, at 2500 R.P.M., the hydrocarbons measured 26 parts per million; carbon monoxide measured 0.02; and carbon dioxide measured 14.5. After installation of this T.C.I. system hydrocarbon emission was reduced to 4 PPM, carbon monoxide to 0.01; and carbon dioxide to 12.0. Fuel efficiency remained approximately the same. Conversion to this T.C.I. method and apparatus with its two ignition chamber zones or stages is simple, since the conventional spark plugs are merely replaced with the T.C.I. units supplied with voltage current as it is normally available for the operation of all such engines and vehicles and the like associated therewith.

Having described only the typical preferred forms and applications of our invention, I do not wish to be limited or restricted to the specific details herein set forth, but wish to reserve to myself any modifications or variations that may appear to those skied in the art, as set forth within the limits of the following claims.

We claim:

1. A method of ignition in internal combustion engines having a compression cycle and ignition of a combustible fuel-air mixture in a combustion chamber followed by a power cycle, and including;

the first step of providing a closed chamber in open communication with the combustion chamber for penetration therein of a pressure front of the combustible fuel-air mixture, the second step of positioning an igniter means at a depth of pressure front penetration of said combustible fuel-air mixture into the closed chamber for contact therewith at a determined compression of said combustible fuel-air mixture, the third step of transferring the pressure front of combustible fuel-air mixture from the combustion chamber and into the closed chamber during the compression cycle, the fourth step of capturing a volume of previously burnt non combustible gasses in the closed chamber for occlusion of the igniter means and for depression as a spring, and the fifth step of depressing said captured previously burnt non combustible gasses with the penetrating pressure front of combustible fuel-air mixture until contact thereof with the igniter means, whereby ignition occurs and is transferred into the combustion chamber for continued burning to effect the power cycle and leaving burnt non combustible gasses in the closed chamber.

2. The method of ignition in internal combustion engines as set forth in claim 1, wherein the first step is performed by providing a chamber timing zone in open communication with the combustion chamber and a buffer zone in open communication with the timing zone and capturing said burnt non combustible gasses as a spring.

3. The method of ignition in internal combustion engines as set forth in claim 1, wherein the second step is performed by maintaining an ignition temperature of said combustible fuel-air mixture, in the igniter means.

4. The method of ignition in internal combustion engines as set forth in claim 2, wherein, the second step is performed by positioning the igniter means at the open communication between the timing zone and the buffer zone.

5. The method of ignition in internal combustion engines as set forth in claim 2, wherein the third step is performed by entering the pressure front of combustible fuel-air mixture into the timing zone in equilibrium with non combusible gasses therein.

6. The method of ignition in internal combustion engines as set forth in claim 2, wherein the fourth step is performed by entering the pressure front of combustible fuel-air mixture into the timing zone in equilibrium with non combustible gasses depressed thereby as a spring in the buffer zone.

7. The method of ignition in internal combustion engines as set forth in claim 3, wherein the fifth step is performed by depressing the gasses in both the timing zone and the buffer zone for entry of the pressure front of combustible fuel-air mixture and its penetration to the igniter means for ignition in response to combustion chamber pressure.

8. The method of ignition in internal combustion engines as set forth in claim 1, wherein the first step is performed by providing a chamber timing zone in open communication with the combustion chamber and a chamber buffer zone in open communication with the timing zone and capturing said burnt non combustible gasses as a spring, wherein the second step is performed by maintaining an ignition temperature of said combustible fuel-air mixture, in the igniter means, wherein the third step is performed by entering the pressure front of combustible fuel-air mixture into the timing zone in equilibrium with non combustible gasses therein, wherein the fourth step is performed by depressing said captured non combustible gasses as a spring, and wherein the fifth step is performed by depressing the gasses in both the timing zone and the buffer zone for entry of the pressure front of combustible fuel-air mixture and its penetration to the igniter means for ignition in response to combustion chamber pressure.

9. The method of ignition in internal combustion engines as set forth in claim 1, wherein the first step is performed by providing a chamber timing zone in open communication with the combustion chamber and a chamber buffer zone !n open communication with the timing zone and capturing said burnt non combustible gasses as a spring, wherein the second step is performed by positioning the igniter means at the open communication between the timing zone and the buffer zone, wherein the third and fourth steps are performed by entering the pressure front of combustible fuel-air mixture into the timing zone in euilibrium with non combustible gasses depressed thereby as a spring in the buffer zone, and wherein the fifth step is performed by depressing the gasses in both the timing zone and the buffer zone for entry of the pressure front of combustible fuel-air mixture and its penetration to the igniter means for ignition In response to combustion chamber pressure.

10. The method of ignition in internal combustion engines as set forth in claim 1, wherein the second step is performed by maintaining a catalyst at ignition temperature of said combustible fuel-air mixture, in the igniter means.

11. Apparatus for timing chamber ignition in internal combustion engines having a combustion chamber, means for intake of a combustible fuel-air mixture, means for effecting a compression cycle followed by a power cycle, and means for exhaust of burnt gasses, and including;
an elongated ignition chamber means comprised of a timing zone with an entry passage in open communication with the combustion chamber and a buffer zone continuing from the timing zone and with a closed end to capture the burnt gasses therein,
igniter means exposed within the ignition chamber between said entry passage and said closed end for ignition of a pressure front of said combustible fuel-air mixture penetrating into the ignition chamber during the compression cycle,
the ignition chamber being closed by said end to capture burnt gasses therein so as to function as a spring opposed to the pressure front of said combustible fuel-air mixture,
whereby burnt gasses occlude the igniter means until exposed to the penetrating pressure front of combustible fuel-air mixture for contact with said igniter means and ignition thereof and transfer of ignition into the combustion chamber to effect the power cycle.

12. The apparatus for engine ignition as set forth in claim 11, wherein the igniter means is positioned intermediate of an exposed to both the timing zone and the continuing buffer zone of the ignition chamber.

13. The apparatuss for engine ignition as set forth in claim 11, wherein the buffer zone is in open communication with and continuing from the timing zone and closed to capture the burnt gasses therein, and wherein the igniter means is positioned between the timing zone and continuing buffer zone.

14. The apparatus for engine ignition as et forth in claim 11, wherein the ignition chamber is an elongated tube, and wherein the igniter means is exposed intermediate the open entry passage thereof into the combustion chamber and the closed top thereof.

15. The apparatus for engine ignition as set forth in claim 11, wherein means adjusts the volume of the ignition chamber.

16. The apparatus for engine ignition as set forth in claim 11, wherein means adjusts the volume of the buffer zone of the ignition chamber.

17. The apparatus for engine ignition as set forth in claim 11, wherein the igniter means is a catalyst.

18. The apparatus for engine ignition as set forth in claim 11, wherein the igniter means is a glow plug maintained at ignition temperature of said combustible fuel-air mixture.

19. The apparatus for engine ignition as set forth in claim 11, wherein the igniter means is glow plug with a catalytic heater element maintained at ignition temperature of said combustible fuel-air mixture.

20. A timing chamber ignition unit for an internal combustion engine having a combustion chamber with an opening replaceably receiving said ignition unit, means for intake of a combustible fuel-air mixture, means for effecting a compression cycle followed by a power cycle, and means for exhaust of burnt gasses, said ignition unit including;
a body secured to the engine and with an elongated ignition chamber comprised of a timing zone with an entry passage in open communication with the combustion chamber and a buffer zone continuing from the timing zone and with a closed end to capture the burnt gasses therein,
igniter means carried by the body and exposed within the ignition chamber between said entry passage and said closed end for ignition of a pressure front of said combustible fuel-air mixture penetrating into the ignition chamber during the compression cycle,
the ignition chamber being closed by said end to capture burnt gasses therein so as to function as a spring opposed to the pressure front of said combustible fuel-air mixture,
whereby burnt gasses occlude the igniter means until exposed to the penetrating pressure front of combustible fuel-air mixture for contact with said igniter means and ignition thereof and transfer of ignition into the combustion chamber to effect the power cycle.

21. The timing chamber ignition unit as set forth in claim 20, wherein the igniter means is positioned intermediate of and exposed to both the timing zone and the continuing buffer zone of the ignition chamber.

22. The timing chamber ignition unit as set forth in claim 20, wherein the buffer zone is in open communication with and continuing from the timing zone and closed to capture the burnt gasses therein, and wherein the igniter means is positioned between the timing zone and continuing buffer zone.

23. The timing chamber ignition unit as set forth in claim 20, wherein the ignition chamber is an elongated tube, and wherein the igniter means is exposed intermediate the open entry passage thereof into the combustion chamber and the closed top thereof.

24. The timing chamber ignition unit as set forth in claim 20, wherein means adjusts the volume of the ignition chamber.

25. The timing chamber ignition unit as set forth in claim 20, wherein means adjusts the volume of the buffer zone of the ignition chamber.

26. The timing chamber ignition unit as set forth in claim 20, wherein the igniter means is a catalyst.

27. The timing chamber ignition unit as set forth in claim 20, wherein the igniter means is a glow plug maintained at ignition temperature of said combustible fuel-air mixture.

28. The timing chamber ignition unit as set forth in claim 20, wherein the igniter means is glow plug with a catalytic heater element maintained at ignition temperature of said combustible fuel-air mixture.

* * * * *

UNITED STATES PATENT AND TRADEMARK OFFICE
CERTIFICATE OF CORRECTION

PATENT NO. : 4,977,873

DATED : Dec. 18, 1990

INVENTOR(S) : MARK A. CHERRY

It is certified that error appears in the above—identified patent and that said Letters Patent is hereby corrected as shown below:

On the title page, under item [19], after "Cherry" delete "et al";
in item [75], line 1, delete "El Cajon, Calif.;";
lines 2 and 3, change "Clifford L. Elmore, 1568 Honey Hill Ter., El Cajon, Calif. 92020" to
--965 A Jamacha Road, El Cajon, Calif. 92019--.

Col. 1 line 66 after "charge" insert -- . --.
Col. 2 line 36 change "shied" to -- shield --; and line 55 change "operatIve" to -- operative --.
Col. 5 line 45 change "pug" to -- plug --. Col. 7 line 15 before "not" insert -- ( --; line 18 change "inJec-" to -- injec- --; line 44 change "proJections" to -- projections --; line 50 before "low" delete -- ; --; and line 60 change "subJected" to -- subjected --. And Col. 8 line 10 change "skied" to -- skilled --.

IN THE CLAIMS:
Col. 8 line 12 change "We" to -- I --. Col. 9 line 31 change " !n " to -- in --; and line 44 change "In" to -- in --; Col. 10 line 11 change "an" to -- and --; line 13 change "apparatuss" to -- apparatus --; line 23 change "top" to -- end --.

Page 1 of 2

UNITED STATES PATENT AND TRADEMARK OFFICE
CERTIFICATE OF CORRECTION

PATENT NO.   : 4,977,873
DATED        : Dec. 18, 1990
INVENTOR(S)  : MARK A. CHERRY

It is certified that error appears in the above-identified patent and that said Letters Patent is hereby corrected as shown below:

Col. 11, line 17 change "top" to -- end --.

Signed and Sealed this

Thirtieth Day of June, 1992

Attest:

DOUGLAS B. COMER

*Attesting Officer*   Acting Commissioner of Patents and Trademarks